Nov. 16, 1965 D. L. CONNER 3,218,110

FACE SEAL ASSEMBLY

Filed Jan. 16, 1961

INVENTOR:
Dewey L. Conner
BY
Glenn B. Moore
Attorney

3,218,110
FACE SEAL ASSEMBLY
Dewey L. Conner, 446 Hubbard NE.,
Grand Rapids, Mich.
Filed Jan. 16, 1961, Ser. No. 83,079
7 Claims. (Cl. 308—187.2)

This invention relates to the construction of face seals. This type of device is used where it becomes necessary to seal a rotating shaft against a pressure differential where the area around the shaft bearing must act as a barrier separating the higher from the lower pressures. Unless special provision is made, the gas or liquid tends to move along the shaft in response to the pressure differential, and this may result in contamination of the medium on one side, or in gradual loss of lubricant. In pumping toxic or corrosive materials, the problem is obviously aggravated.

The "face seal" is a well-known type of device developed to provide an answer to this problem. Essentially, the functions of the face seal are centered in a pair of coaxial rings, one of which rotates with the shaft, the other remaining fixed with respect to the housing or bearing. The opposing faces of these two rings are maintained in engagement under a light and preferably constant pressure, and the surfaces of these faces are very carefully prepared to provide as near as possible to absolute flatness. It is the usual procedure to lap them to flatness within one helium light band. This test for flatness is well-known, and is determined by laying the surface being tested against a standard optical flat. The relationship between the surface being tested and the reference plate appears as a pattern of light bands registering the variations from absolute planar relationship. The specification of flatness in terms of light bands can be converted to other equivalents by the use of a constant which is the wave length of the light from incandescent helium (the usual test source).

The usual face seal assembly includes several related parts which are included to position the sealing rings with respect to the surrounding machine, and to establish the necessary axial pressure maintaining the two rings in engagement. As long as the two rings are in contact, the degree of flatness is such that a sufficiently close inter-engagement of the surfaces exists so that the gas or liquid molecules do not enter between the ring surfaces. A very light pressure is all that is required to maintain the surfaces in engagement, and an excessively heavy pressure is likely to cause frictional drag on the shaft and also tend to induce distortion of the sealing surfaces themselves.

The conventional face seal assembly will include some form of an abutment ring which may be fixed with respect to either the shaft or the housing, and a spring system which will act between the abutment ring and one of the sealing rings. The opposite sealing ring is then locked against axial movement, and is held against rotation with respect to the opposite of the two components to which the other sealing ring is fixed. Sealing between components which are fixed with respect to each other is a fairly simple matter, and is conventionally accomplished through the use of packing or O-rings.

Several difficulties have arisen in the manufacture, service, and replacement of face seal assemblies. To begin with, the above summary of components includes a number of separate items which are relatively difficult to install piece-by-piece in a machine. This problem is complicated by the fact that the greatest care must be observed in handling the sealing rings themselves to avoid marring or contaminating the sealing surfaces. The presence of so much as a finger print on one of these faces will be sufficient to interfere with the sealing function. This difficulty has required highly skilled workmen in the assembly, maintenance, and replacement of these devices, and often necessitates the return of the machine components to the factory for service or replacement.

Applicant has provided for protecting the sealing faces by maintaining them in engagement during the installation and removal of the assembly in the surrounding machine. This principle has been extended to permit the entire assembly to be handled as either one or two sub-assemblies; and in the latter case, one of the sub-assemblies will include both of the sealing rings so that they can be maintained in engagement at all times. The several features of the invention will be analyzed in detail through a discussion of the particular embodiments illustrated in the accompanying drawings.

Figure 1:
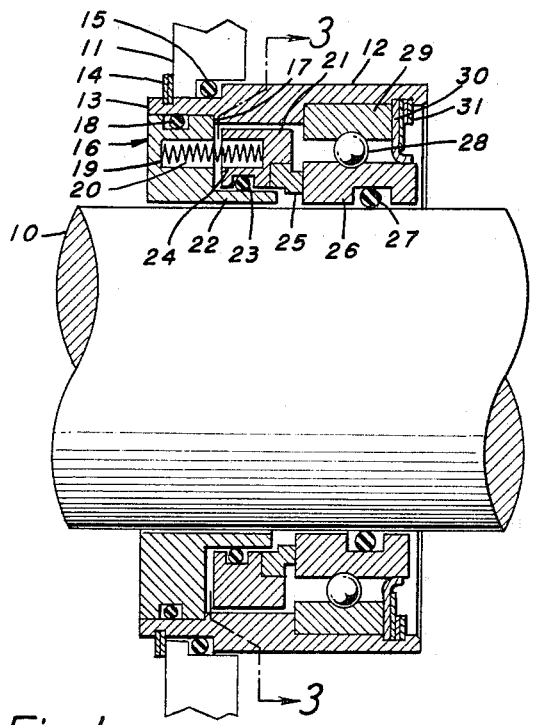
FIGURE 1 is an axial sectional elevation of a face seal assembly around a rotating shaft.
Figure 2:
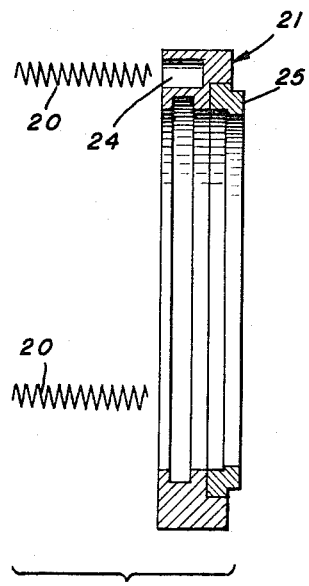
FIGURE 2 illustrates one of the sealing rings in axial section, and illustrates the position of the biasing springs with respect to this ring.
Figure 3:
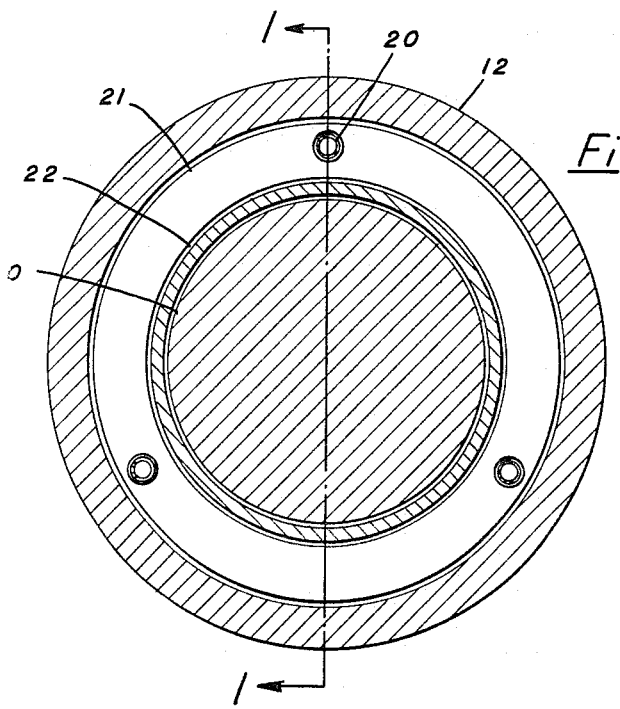

FIGURE 3 presents a section perpendicular to the axis of the assembly of FIGURE 1, on the plane 3—3 of FIGURE 1.

Referring to FIGURE 1, the shaft 10 is rotatably mounted with respect to the housing 11 shown in dotted lines. The bearings for maintaining the alignment of the shaft with respect to the machine housing 11 form no part of this invention, and are not shown in FIGURE 1. The face seal illustrated in FIGURE 1 includes the outer shell ring 12 having an inner portion of reduced diameter indicated at 13, with the shell ring 12 being held with respect to the machine frame 11 by the combined effect of the retaining ring 14 and the O-ring 15. This O-ring is a conventional device, and is usually formed of a material such as rubber, neoprene, or some other material having considerable resilience or resistance to attack from corrosive materials. A pressure differential between the inside and outside of the machine frame 11 will result in movement of the ring 15 to one side or the other of the space within which it is confined, and it will block any movement of liquid or gas between the machine frame and the ring 12. The O-ring will be normally under considerable radial compression, and this will generate a sufficient frictional resistance between the periphery of the portion 13 of the ring 12 and the machine frame 11 to rotatively secure these two components with respect to each other. There is no need for a large magnitude of torsional effect here, since the torsion required to drive one sealing ring with respect to the other is normally very small.

In the device shown in FIGURE 1, the pressure may be considered as positive at the left side of the assembly. With such an arrangement, the abutment ring 16 is received within the shell ring 12, and is axially forced against the shoulder 17, as shown. An O-ring 18 is interposed between the abutment ring 16 and the inside of the shell ring 12 to prevent movement of gas or liquid in that area, and also to provide the frictional torsional effect to rotatively hold the abutment ring 16 with respect to the shell ring 12. The shell ring 12 and the abutment ring 16 together form a housing for the seal unit. The abutment ring 16 is provided with a series of holes 19 spaced around its periphery, and arranged parallel to the axis of the device. These holes provide recesses for the springs 20 which act between the shell ring 16 and the sealing ring 21. The abutment ring 16 also has an axial extension of reduced diameter indicated at 22, which is inter-engaged with the sealing ring 21. The O-ring 23 is provided for preventing the flow of gas or liquid between these members, and also for providing the necessary torsional transfer to hold the rings 16 and 21 against relative rotation. A group of recesses 24 is provided in the sealing ring 21 opposite the recesses 19 to receive the opposite ends of springs 20. The function of the spring system is to provide a light biasing effect tending to move the ring 21 axially to the right so that the exposed axial face of the insert 25 is held lightly in engagement with the opposite seal face on the inner race ring 26. The insert 25 may be of graphite or any other conventional material used for sealing rings, with the remainder of the ring 21 being usually of brass or steel. The inner race ring 26 is rotatively held with respect to the shaft 10 by the function of the O-ring 27, which also prevents movement of the fluid between the shaft and the seal assembly. In applications where the friction of the ring 27 is not sufficient to assure driving the ring 26, a conventional positive drive (not shown) may be used. The group of ball bearings 28 acts between the ring 26 and the race 29, which is received within a suitable bore in the shell ring 12 with a close fit. A dust seal 30 is normally used, together with a retaining ring 31. The net effect of this portion of the assembly is to hold the ring 26 against axial displacement with respect to the shaft 10, and also to maintain the relative coaxial alignment of the several portions of the assembly. One of the functions served by the housing 12–16 is the maintenance of this axial positioning of the components without the necessity of either an offset in the shaft 10, or the provision of a shaft groove for receiving a retaining ring. With this arrangement, the shaft may be permitted a considerable amount of end-play without damaging the seal assembly in any way.

The presence of the bearing device 26–28–29 has a rather interesting effect upon the wear tendencies at the seal faces. Even if minute irregularities exist in these surfaces, they will tend to progressively meet each other and compensate as long as there is an exact coaxial relationship of the rotation of the two sealing rings. The presence of bearings associated exclusively with the seal, and not directly associated with the shaft (as a result of the resilient support of the seal assembly on the seals 18 and 27 acting also as cushions), will have a strong tendency to maintain this coaxial relationship.

The proportions of the sealing ring may be arranged so that the net result is a pressure balance such that the biasing effect of the springs is not augmented or decreased as a result of variations in the pressure differential maintained by the seal. The most critical area to note in determining the degree of balance, or lack of it, is in the area adjacent the O-ring interposed between the sealing ring and the abutment ring. Pressure entering from the left, as shown in the several views, will be brought to bear upon the right-hand projected area of the O-ring, and will therefore generate a tendency to move the sealing ring to the left against the action of the springs. In opposition to this force, however, is the effect of this same pressure operating on the right-hand face of the groove receiving this O-ring, and also upon the illustrated offset in the insert of the sealing ring. These proportions can be selected to provide the necessary degree of balance.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A face seal assembly for a shaft rotatably mounted in a machine, said assembly comprising: a housing ring; an abutment ring normally received within and fixed with respect to said housing ring, said abutment ring having an axial extension of reduced outside diameter; O-ring seal means normally interposed between said housing ring and said abutment ring and providing frictional transfer of torque maintaining the relative angular position of said housing ring about the axis of said abutment ring; a first seal-face ring, said first seal-face ring being coaxial with said abutment ring and surrounding said abutment ring extension of reduced outside diameter; O-ring seal means interposed between said abutment ring and said first seal-face ring and providing frictional transfer of torque maintaining the relative angular position of said abutment ring and first seal-face ring about the axis thereof; a second seal-face ring, said first and second seal-face rings being concentric and normally disposed with the sealing faces thereof interengaged; biasing means acting between said abutment ring and said first seal-face ring urging said first seal-face ring axially toward said second seal face ring; O-ring seal means normally interposed between said shaft and said second seal-face ring and providing frictional transfer of torque causing said second seal-face ring to rotate with said shaft; radial and thrust bearing means acting between said second seal-face ring and said housing; retaining means normally positioning said bearing means with respect to said housing ring.

2. A face seal assembly for a shaft rotatably mounted in a machine, said assembly comprising: a housing ring; an abutment ring normally received within and fixed with respect to said housing ring, said abutment ring having an axial extension of reduced outside diameter; seal means normally interposed between said housing ring and said abutment ring and providing frictional transfer of torque maintaining the relative angular position of said housing ring about the axis of said abutment ring; a first seal-face ring, said first seal-face ring being coaxial with said abutment ring and surrounding said abutment ring extension of reduced outside diameter; fixed seal means interposed between said abutment ring and said first seal-face ring and providing frictional transfer of torque maintaining the relative angular position of said abutment ring and first seal-face ring about the axis thereof; a second seal-face ring, said first and second seal-face rings being concentric and normally disposed with the sealing faces thereof interengaged; biasing means acting between said abutment ring and said first seal-face ring urging said first seal-face ring axially toward said second seal face ring; seal means normally interposed between said shaft and said second seal-face ring and providing frictional transfer of torque causing said second seal-face ring to rotate with said shaft; thrust bearing means acting between said second seal-face ring and said housing; retaining means normally positioning said thrust bearing means with respect to said housing ring.

3. A face seal assembly for a shaft rotatably mounted in a machine, said assembly comprising: a housing ring; an abutment ring; seal means normally interposed between said housing ring and said abutment ring and providing frictional transfer of torque maintaining the relative angular position of said housing ring about the axis of said abutment ring; a first seal-face ring, said first seal-face ring being coaxial with said abutment ring; fixed seal means interposed between said abutment ring and said first seal-face ring and providing frictional transfer of torque maintaining the relative angular position of said abutment ring and first seal-face ring about the axis thereof; a second seal-face ring, said first and second seal-face rings being concentric and normally disposed with the sealing faces thereof interengaged; biasing means acting between said abutment ring and said first seal-face ring urging said first seal-face ring axially toward said second seal face ring; seal means normally interposed between said shaft and said second seal-face ring and providing frictional transfer of torque causing said second seal-face ring to rotate with said shaft; and radial bearing means acting between said second seal-face ring and said housing.

4. In combination with a machine having a frame and a shaft rotatably mounted in said frame, a face-seal assembly, comprising:

a housing ring having an abutment portion providing an axially-facing surface, and also having an outer shell portion extending axially from said abutment portion;

a bearing device including relatively rotatable members coaxial with said housing ring, and having one of said members fixed with respect to said housing ring and axially spaced from said abutment portion, the other of said bearing members having a face-seal portion opposite and spaced from said abutment portion;

a seal-face ring axially interengaged with said housing ring, and having the seal face thereof bearing against the seal face of said other bearing member;

a seal interposed between the abutment portion of said housing ring and said seal-face ring;

biasing means acting between said abutment portion and said seal-face ring urging said seal-face ring against said other bearing member; and resilient sealing cushion means disposed on said other bearing member and on the said housing ring, respectively, whereby said face seal assembly is resiliently supported on the interior and exterior thereof by said cushion means bearing against said shaft and said frame, respectively.

5. A face-seal assembly as defined in claim 4, wherein said bearing members are inner and outer race rings with planetary bearing members interposed between said race rings.

6. A face-seal assembly as defined in claim 5, wherein said outer shell portion is secured to the outer of said race rings.

7. A face-seal assembly as defined in claim 4 wherein said resilient sealing cushion means are axially spaced.

References Cited by the Examiner
UNITED STATES PATENTS

| | | | |
|---|---|---|---|
| 973,641 | 10/1910 | Dysart. | |
| 2,189,685 | 2/1940 | Stevenson | 308—187.1 X |
| 2,251,228 | 7/1941 | Leister | 308—184 |
| 2,628,852 | 2/1953 | Voyeth | 277—81 |
| 2,653,063 | 9/1953 | Arndt | 308—184 |
| 2,713,504 | 7/1955 | Coleman | 286—11.2 |
| 2,736,579 | 2/1956 | Dickinson | 286—11.2 |
| 2,835,515 | 5/1958 | Solari | 286—11.14 |
| 2,911,241 | 11/1959 | Horvath et al. | 286—11.14 |
| 2,979,348 | 4/1961 | Rosmiansky | 277—81 |
| 2,996,295 | 8/1961 | Smith. | |
| 3,015,932 | 1/1962 | McCard | 308—184 X |
| 3,101,200 | 8/1963 | Tracy | 277—93 |

DON A. WAITE, *Primary Examiner.*

MORRIS M. FRITZ, WALTER A. SCHEEL, EDWARD V. BENHAM, FRANK SUSKO, *Examiners.*